United States Patent
Nielsen et al.

(10) Patent No.: US 8,918,452 B2
(45) Date of Patent: Dec. 23, 2014

(54) WEB API FRAMEWORK

(75) Inventors: Henrik Frystyk Nielsen, Hunts Point, WA (US); Glenn Block, Seattle, WA (US); Randall Tombaugh, Bellevue, WA (US); Ronald A. Cain, Redmond, WA (US); HongMei Ge, Bellevue, WA (US); Alexander Corradini, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 5 days.

(21) Appl. No.: 13/247,700

(22) Filed: Sep. 28, 2011

(65) Prior Publication Data

US 2013/0080505 A1    Mar. 28, 2013

(51) Int. Cl.
*G06F 15/16* (2006.01)
*G06F 9/54* (2006.01)
*H04L 29/08* (2006.01)

(52) U.S. Cl.
CPC .............. *H04L 67/02* (2013.01); *G06F 9/546* (2013.01)
USPC ............... 709/203; 380/2; 380/277; 380/286; 715/734; 715/736; 726/22; 726/24; 726/26

(58) Field of Classification Search
USPC ............... 709/203; 380/2, 277, 286; 715/734, 715/736; 726/22, 24, 26
See application file for complete search history.

(56) References Cited

U.S. PATENT DOCUMENTS

| | | | |
|---|---|---|---|
| 6,850,979 B1 | 2/2005 | Saulpaugh et al. | |
| 7,000,238 B2 | 2/2006 | Nadler et al. | |
| 7,089,560 B1 * | 8/2006 | Uhler et al. | 719/311 |
| 7,730,204 B2 | 6/2010 | Pak | |
| 7,801,945 B1 * | 9/2010 | Geddes et al. | 709/203 |
| 2005/0240558 A1 * | 10/2005 | Gil et al. | 707/1 |
| 2006/0085421 A1 | 4/2006 | Backhouse et al. | |
| 2008/0091845 A1 * | 4/2008 | Mills et al. | 709/246 |
| 2008/0155110 A1 * | 6/2008 | Morris | 709/230 |
| 2008/0243994 A1 * | 10/2008 | Kropivny | 709/203 |
| 2009/0313319 A1 * | 12/2009 | Beisiegel et al. | 709/203 |
| 2010/0306344 A1 * | 12/2010 | Athas et al. | 709/219 |
| 2012/0036178 A1 * | 2/2012 | Gavini et al. | 709/203 |

OTHER PUBLICATIONS

Earley, Erwin, "Implementing PHP and RPG Web Services," retrieved from:—http://systeminetwork.com/article/ implementing-php-and-rpg-web-services—on Jul. 13, 2011, dated Sep. 1, 2010, (4 pages).
Sun Microsystems, "About Web Services," Sun Java System Application Server Standard and Enterprise Edition 7 2004Q2 Developer's Guide to Web Services, retrieved from—http://download.oracle.com/docs/cd/ E19644-01/817-5452/wsgoverview.html—on Jul. 13, 2011, dated 2004, (14 pages).
MSDN, "Asp.Net Overview, .NET Framework 4" retrieved from—http://msdn.microsoft.com/en-us/library/4w3ex9c2.aspx—on J2011, no date, (12 pages).
Smith, Justin, "HTTP Programming with WCF and the .NET Framework 3.5," retrieved from—http://msdn.microsoft.com/en-us/magazine/cc135976.aspx—on Jul. 13, 2011, dated 2011, (9 pages).

* cited by examiner

*Primary Examiner* — Jason K. Gee
*Assistant Examiner* — Sharif E Ullah
(74) *Attorney, Agent, or Firm* — Benjamin Tabor; Katherine Drakos; Micky Minhas

(57) ABSTRACT

Embodiments allow developers to use HTTP message abstractions inline within their Web API methods to directly access and manipulate HTTP request and response messages. A hosting layer is provided for in-process, in-memory and network-based services. Message handlers and operational handlers may be combined to create a message channel for asynchronous manipulations of the HTTP requests and response. A formatter may be used on the server or client for consuming HTTP and providing desired media types.

16 Claims, 5 Drawing Sheets

WEB API FRAMEWORK

BACKGROUND

Hypertext Transfer Protocol (HTTP) provides a simple application model for exchanging information between servers and clients. The most common approach uses HTTP for delivering web pages for presentation on a browser. A Web API (Application Programming Interface) is a defined set of HTTP request and response messages, typically expressed in JSON (JavaScript Object Notation) or XML (Extensible Markup Language). The idea of exposing resources as Web APIs that expose data and logic for programmatic consumption is gaining popularity. These APIs are exposed to a broad range of clients running on many different devices. Each of these clients often has different capabilities. HTTP is well suited for these scenarios because it allows different clients to receive different representations to meet the needs of each client. Additionally, there are many scalability and evolvability benefits to systems that directly leverage HTTP. As a result, Web APIs are an attractive choice for many systems being built today.

Typically HTTP messages are exchanged over the Internet using TCP/IP (Transmission Control Protocol/Internet Protocol) as the underlying transport protocol stack. However, HTTP is not inherently reliant on TCP/IP and can be used over any number of transport protocol stacks as long as the protocol semantics are honored. As HTTP continues to gain popularity and more and more components use HTTP to expose their functionality, being able to communicate not only across the Internet but also between components located within the same application domain is increasingly important.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide a highly efficient end-to-end communication mechanism for exchanging HTTP traffic between clients and servers whether they are running in the same process or separated by a network boundary. Fine-grained manipulation of HTTP messages is provided in order to achieve richer client interactions and to benefit from the web intermediaries. Such message may also be exchanged in an in-process fashion where the client and server live in the same app domain.

Embodiments of the invention provide benefits over traditional HTTP message-based exchange mechanisms, such as:

HTTP message exchanges may occur either in-process or on the network;

Web APIs may support a multitude of media types and formats and are not limited to XML and JSON;

Clients may choose from available formats using content negotiation;

Async inspection and manipulation of HTTP messages; and

A first class programming model for authoring Web APIs and building RESTful systems is provided.

Developers author one or more Web APIs, which are classes that contain methods that map to HTTP methods and a URI (Uniform Resource Identifier). The parameters of the Web API methods are values that are serialized/deserialized from the body of the message, the URI parameters, or from other parts of the message. Developers use HTTP message abstractions inline—within their Web API methods—for directly accessing and manipulating the request and response. To support different clients, Web API allows a developer to supply pluggable formatters that handle different media types. For addressing cross-cutting/low-level HTTP concerns, Web API provides an extensible async pipeline. At runtime, the developer has a range of hosting options including self-hosted (mini web server), on top of IIS/ASP.NET or in process.

Embodiments of the invention provide a hosting layer for in-process and network based services. A pluggable high message channel (Message Handlers) provides asynchronous manipulations of HTTP requests and response. A pluggable formatting mechanism provides support for a multitude of clients and formats.

Also, on the client side API is provided for consuming HTTP either on a standalone client or for middle tier scenarios.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
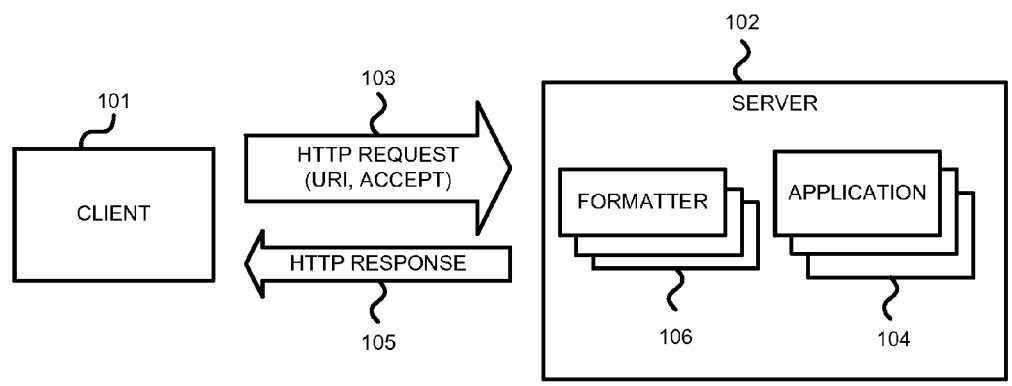
FIG. 1 is a block diagram illustrating an interaction between a client and a server according to one embodiment.

FIG. 1 is a block diagram illustrating an interaction between a client 101 and a server 102 according to one embodiment. Client 101 sends request 103 over an HTTP transport to server 102. Server 102 processes the request using one or more applications 104. Server 102 generates response 105, which is sent back to client 101 over the HTTP transport.

Request 103 comprises a header portion with an Accept header field that contains a list of MIME media types that will be accepted by the client 101. The Accept header is used to specify certain media types that are acceptable for response 105. Problems arise when an application 104 on server 102 is not configured to provide a response in one of the media types listed in the accept header of request 103. For example, if application 104 has a strongly typed domain, it may not be configured to provide the format identified in the Accept header.

Server 102 may use the URI in the header of request 103 to identify what operation to execute within the domain of application 104. The header URI may match to a specific part of application 104 to be executed. The Accept header in request 103 defines the format or specific content type that server 102 should use to respond in response 105. The application 104 is designed to accept a specific input format and to generate a specific output format in the domain selected by the developer. Those formats may not correspond to the media types listed in request 103. In one embodiment, server 102 may address this problem by providing a formatter 106 that converts the information in request 103 to a format understood by application 104. Likewise, server 102 uses formatter 106 to convert the output of application 104 to the media type identified in request 103 before preparing response 105.

In one embodiment, server 102 may select a default formatter 106 unless other data in request 103 indicates that another formatter 106 should be used. For example, formatter 106 may be selected based upon the message content type that is identified in the request 103 header. Alternatively, the Accept header may be used by server 102 to determine which formatter 106 to use. In other embodiments, the request URI may be used to identify the proper formatter 106.

Formatters 106 convert and change the content received in request 103 to a format useable by application 104. Similarly, formatter 106 converts the output of application 104 to a format identified for response 105. A developer of application 104 or a third party may create formatter 106 to convert between two or more different media types. Formatter 106 extracts content from request 103 and populates the application domain types.

Figure 2:
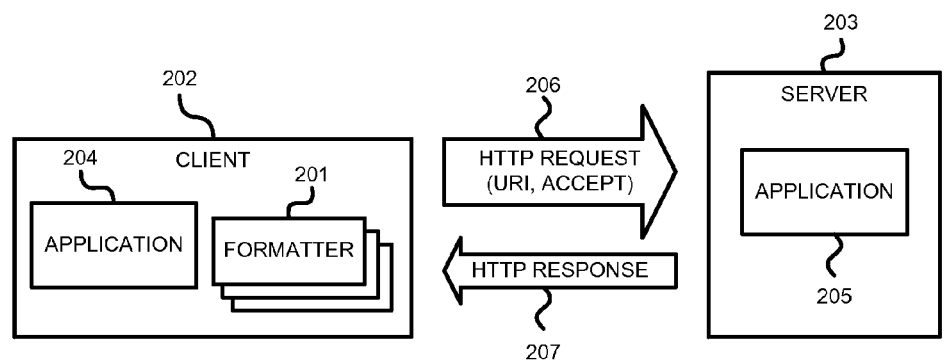
FIG. 2 is a block diagram illustrating an alternative embodiment in which a formatter is used in a client instead of in the server.

FIG. 2 is a block diagram illustrating an alternative embodiment in which a formatter 201 is used in client 202 instead of server 203. Client 202 may run an application 204 having a strongly typed domain. Server 203 runs application 205, which has a different strongly typed domain. Formatter 201 in client 202 may be used to map content from the domain of application 204 to data that can be used in the domain of application 205. Client 202 then generates HTTP request 206 having content that can be directly used by server 203 and application 205.

Server 203 then generates HTTP response 207 from the output of application 205. Response 207 has content formatted according to the domain of application 205. Upon receipt of response 207 at client 202, formatter 201 maps the content of response 207 to the format required by the domain of application 204.

Client 202 may have a plurality of formatters 201. Client 202 selects the appropriate formatter 201 to map content between the domains of applications 204 and 205. In one embodiment, the selection of formatter 201 may be based upon a URI of server 203.

In other embodiments, both the client and server may have formatters and either or both devices may be configured to select a formatter based upon information in the HTTP request or response.

Figure 3:
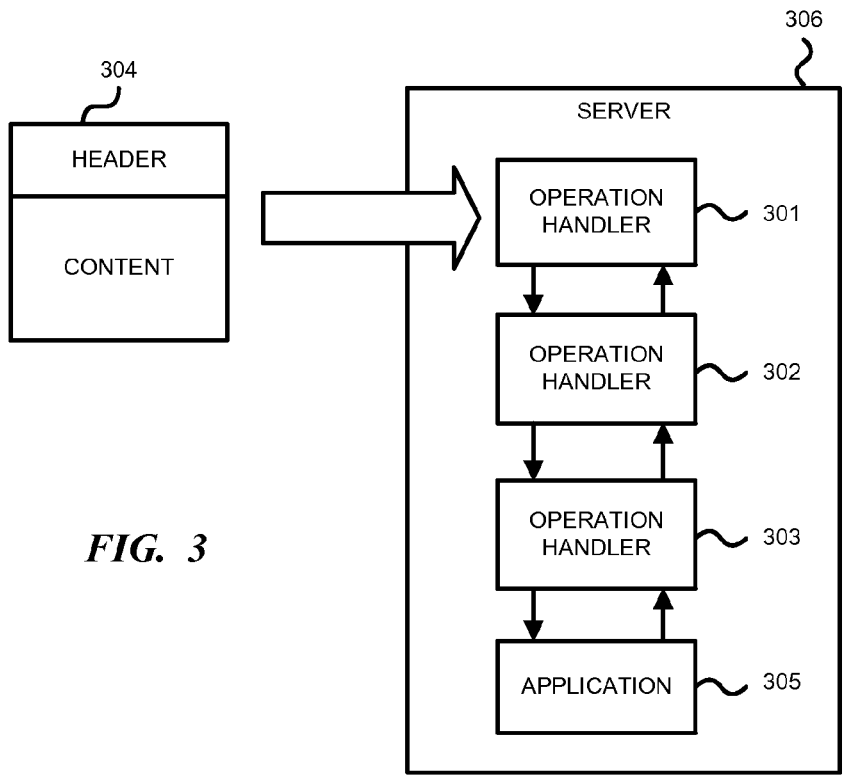
FIG. 3 is a block diagram illustrating the use of message handlers to process an incoming message and to implement an application on the server.

FIG. 3 is a block diagram illustrating the use of operation handlers 301-303 to process incoming operation 304 and to implement application 305 on server 306. Operation handlers 301-303 comprise code that understands the properties of message 304 and the custom types required in application 305. A single operation handler may provide an interface between message 304 and application 305. Alternatively, two or more operation handlers 301-303 may be coupled to create a pipeline between the received message 304 and the application 305.

The operation handlers 301-303 provide an extensibility model that allows server 306 to extend the custom types used in the domain of application 305 to any message types 304. The operation handlers 301-303 ensure that application 305 has all of the components and types that it needs to start running when required. The operation handlers 301-303 use the content of message 304 to generate the proper types needed for the input to application 305. For example, the operation handlers may analyze the HTTP request and then add or remove header information or otherwise modify the request content as needed to provide the domain type information required in application 305.

In one embodiment, at the start-up of application 305, server 306 analyzes the extension code in operation handlers 301-303 to ensure that application 305 will have the inputs required by the application methods to operate on message 304. Server 306 identifies the inputs needed by application 305, identifies what information is provided by operation handlers 301-303, and determines if the information available at the output of the operation handler pipeline matches the inputs required by application 305. By performing this analysis at start-up, server 306 can prevent the application from failing when an actual message arrives. Server 306 can identify any missing information at the input to application 305 on start-up and adjust the operation handlers 301-303 used in the input pipeline to provide the required format or type.

Figure 4:
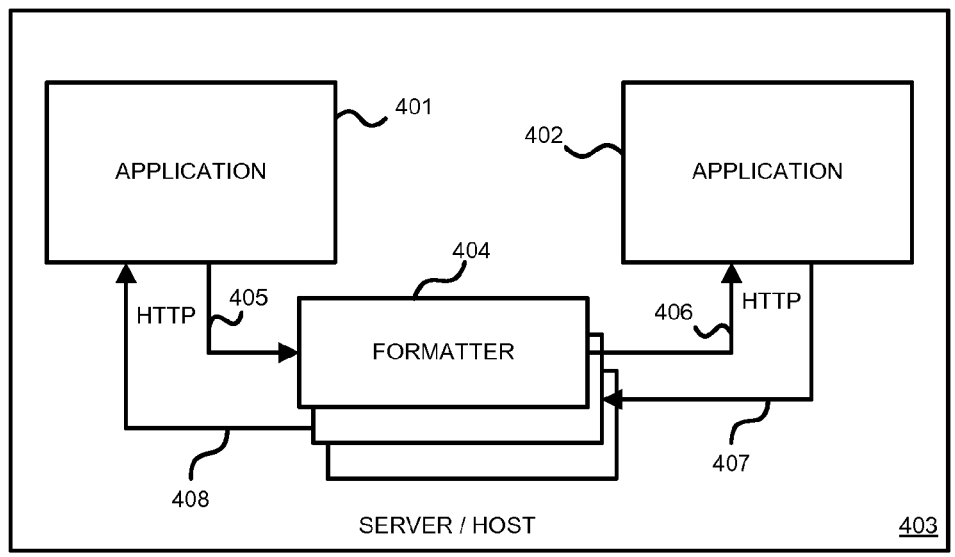
FIG. 4 is a block diagram illustrating the use of formatters to support an in-memory or in-process channel.

FIG. 4 is a block diagram illustrating the use of formatters to support an in-memory or in-process channel. In one embodiment, applications 401 and 402 are hosted on server 403. Applications 401, 402 may be separate applications or they may be different components of the same application. Even though applications 401 and 402 are located on the same host, they may communicate with each other using HTTP requests and responses as if one was a client and the other a server.

Applications 401 and 402 may have different domain types that are not directly compatible with or understood by the other application. Similar to the traditional network-based HTTP communication illustrated in FIGS. 1 and 2, applications 401 and 402 may communicate using one or more formatters 404. For example, an HTTP request 405 sent by application 401 may not be compatible with the domain type of application 402. Formatter 404 maps the information from the request 405 into new request 406 having the proper format for the domain of application 402, which processes the request.

Application 402 generates an HTTP response 407 corresponding to the domain of application 402. Response 407 is converted by formatter 404 into response 408, which can be understood by the domain of application 401. The formatter used for the mapping the response messages 407/408 may be the same as or different from the formatter used to map the request messages 405/406.

Figure 5:
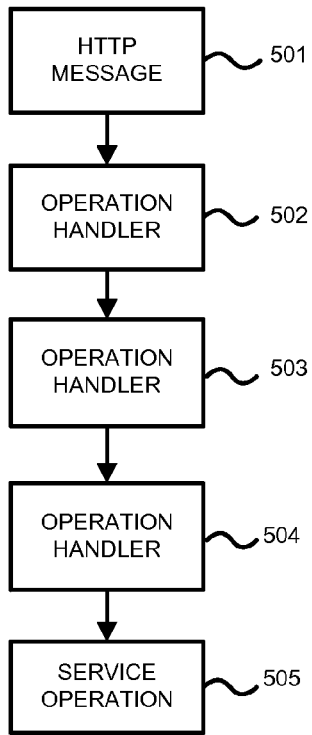
FIG. 5 is a block diagram illustrating a message channel in which the received HTTP message may be manipulated using a pipeline of operation handlers.

FIG. 5 is a block diagram illustrating a message channel in which the media types of a received HTTP message 501 may be asynchronously manipulated using a pipeline of operational handlers 502-504. HTTP message 501 is converted by the pipeline into service operation 505, which corresponds to the domain types of a target application or service.

Figure 6:
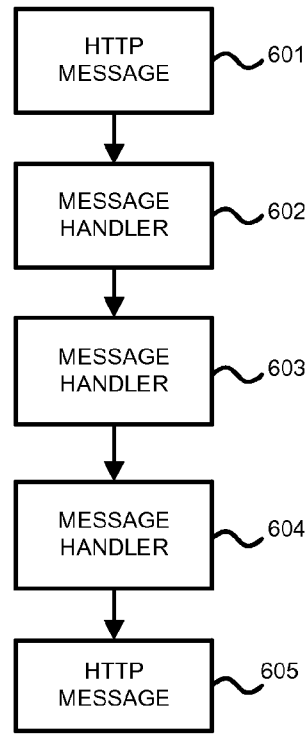
FIG. 6 is a block diagram illustrating a message channel in which the received HTTP message may be asynchronously manipulated using a pipeline of message handlers to generate a new HTTP message.

FIG. 6 is a block diagram illustrating a message channel in which the media types of a received HTTP message 601 may be asynchronously manipulated using a pipeline of message handlers 602-604 to generate new HTTP message 605. In this way, the domain types carried in HTTP message 601 may be converted to domain types required by a destination application without requiring the sending client to know or understand the destination domain.

The message handlers may operate asynchronously. Once the message handler begins processing the HTTP request, for example, it may pause if external data or events are required for the processing.

Figure 7:
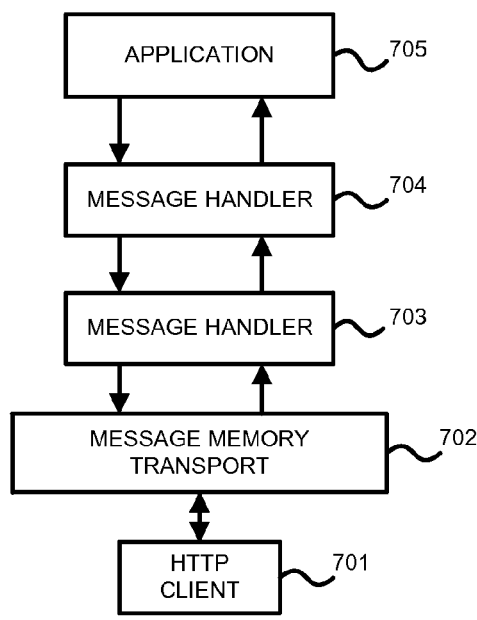
FIG. 7 is a block diagram illustrating an in-memory HTTP channel architecture.

FIG. 7 is a block diagram illustrating an in-memory HTTP channel architecture. HTTP client 701 sends HTTP messages over HTTP memory transport 702 to be processed by message handlers 703, 704. One or more message handlers 703, 704 may be pipelined in HTTP handler channel 703. HTTP messages from HTTP client 701 may be manipulated as needed in message handlers 703, 704 to provide the format required by application 706.

Figure 8:
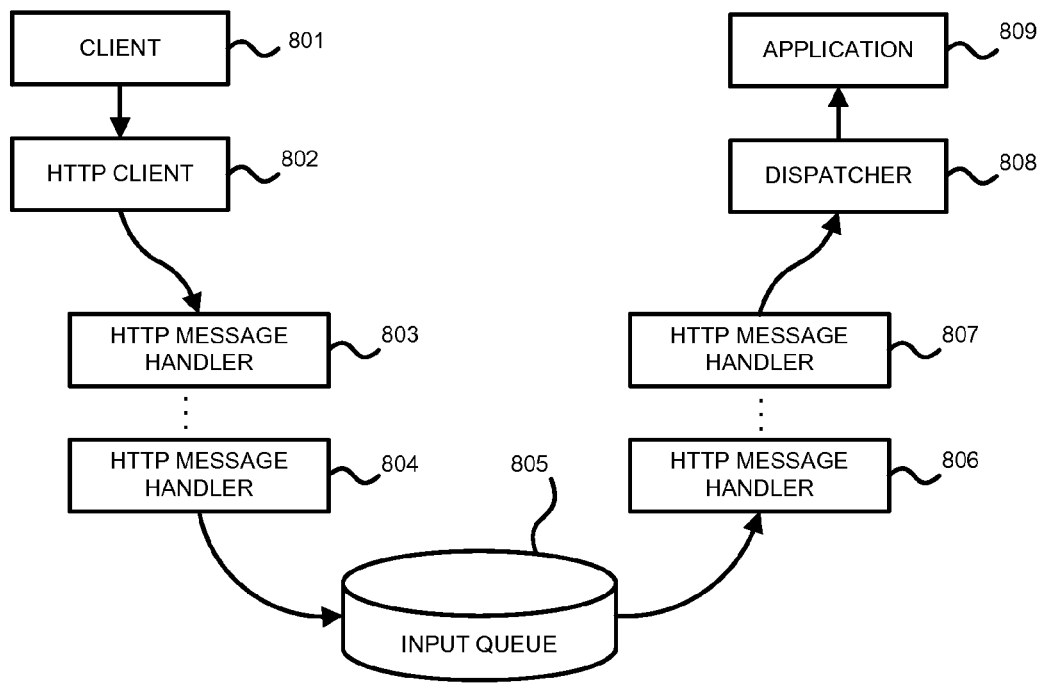
FIG. 8 is a flow chart illustrating an in-memory channel data flow.

FIG. 8 is a flow chart illustrating an in-memory channel data flow in which client 801 accesses an application 809. HTTP client 802 generates an HTTP request. HTTP message handlers 803-804 manipulate the HTTP request content and format. HTTP message handlers 803-804 may determine how to operate on the HTTP request based upon the URI or the accept header media type in the request header. The modified HTTP request is stored to input queue 805. HTTP message handlers 806-807 further manipulate the HTTP request content and format. In dispatcher 808, HTTP description classes express the input and output parameters that are consumed and produced by application 809.

In an example embodiment, the in-memory channel may be implemented as a custom WCF (Windows Communication Foundation) transport channel with a corresponding channel listener. The solution may include a custom WCF binding element that constructs a minimal channel stack. Knowing that the binding will be used when the client and service are running in the same application domain, the channel stack can be constructed using assumptions about the types of messages that it process. Therefore, instead of an encoding step, the message may be simply enqueued and dequeued into an in-memory queue. The channel configuration may be specified on the client as a part of an HTTP client binding configuration that is specified on the server as a part of the endpoint binding configuration.

In one embodiment, the following example code creates a service endpoint and configures it to use the in-memory channel:

var webHost=new WebServiceHost(typeof(T), TestServiceCommon.ServiceAddress);
var memBinding=new HttpMemoryBindingElement( )
var httpBinding=new CustomBinding(memBinding);
var endpoint=webHost.AddServiceEndpoint(typeof(ITestServiceContract), httpBinding, " ");
webHost.Open( );

A corresponding client may then be configured to use the same in-memory binding:

httpClient=memBinding.HttpClient(TestServiceCommon.DefaultHostTimeout);

As the client interacts with the service using httpClient, HTTP message objects will be transmitted using an in-memory queue as an intermediary. This differs significantly from the current process of encoding the message and then passing it to the operating system's networking stack, only to have it sent back to a service running in the same application domain.

Figure 9:
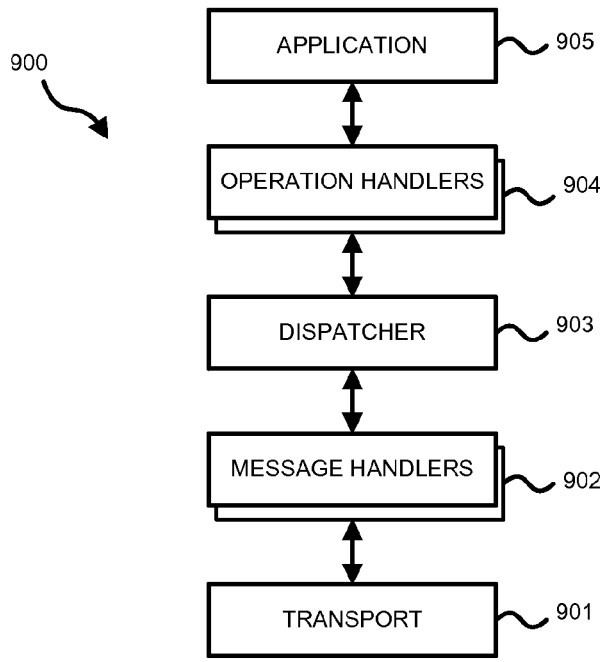
FIG. 9 is a block diagram illustrating a pipeline according to one embodiment of the invention.

FIG. 9 is a block diagram illustrating a pipeline 900 according to one embodiment of the invention. Transport 901 represents a network or an in-memory communication model. Message handlers 902 operate on generic HTTP requests and responses exposing basic HTTP concepts such as HTTP headers, body, request method, status codes, and request URI. Message handlers 902 operate on generic HTTP requests and responses as part of a pipeline.

Dispatcher 903 invokes the application 905 as a result of incoming HTTP requests. Operation handlers 904 operate on typed representations of HTTP requests and responses. Operation handlers 904 convert generic HTTP requests and responses to and from domain application specific typed representations as part of pipeline 900.

It will be understood that the steps of the processes discussed herein may be executed simultaneously and/or sequentially. It will be further understood that each step may be performed in any order and may be performed once or repetitiously.

Figure 10:
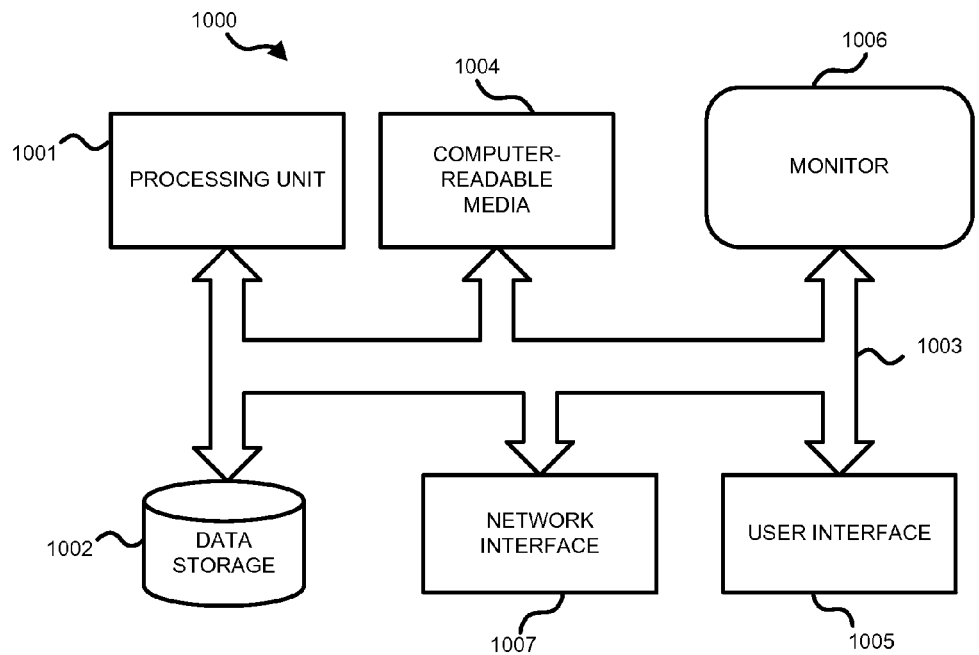
FIG. 10 illustrates an example of a suitable computing and networking environment on which the embodiments may be implemented.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1000. Components may include, but are not limited to, processing unit 1001, data storage 1002, such as a system memory, and system bus 1003 that couples various system components including the data storage 1002 to the processing unit 1001. The system bus 1003 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1000 typically includes a variety of computer-readable media 1004. Computer-readable media 1004 may be any available media that can be accessed by the computer 1001 and includes both volatile and nonvolatile media, and removable and non-removable media. By way of example, and not limitation, computer-readable media 1004 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 1002 includes computer storage media in the form of volatile and/or nonvolatile memory such as read only memory (ROM) and random access memory (RAM). A basic input/output system (BIOS), containing the basic routines that help to transfer information between elements within computer 1000, such as during start-up, is typically stored in ROM. RAM typically contains data and/or program modules that are immediately accessible to and/or presently being operated on by processing unit 1001. By way of example, and not limitation, data storage 1002 holds an operating system, application programs, and other program modules and program data.

Data storage 1002 may also include other removable/non-removable, volatile/nonvolatile computer storage media. By way of example only, data storage 1002 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 1, provide storage of computer-readable instructions, data structures, program modules and other data for the computer 1000.

A user may enter commands and information through a user interface 1005 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 1001 through a user input interface 1005 that is coupled to the system bus 1003, but may be connected by other interface and bus structures, such as a parallel port, game port or a universal serial bus (USB). A monitor 1006 or other type of display device is also connected to the system bus 1003 via an interface, such as a video interface. The monitor 1006 may also be integrated with a touch-screen panel or the like. Note that the monitor and/or touch screen panel can be physically coupled to a housing in which the computing device 1000 is incorporated, such as in a tablet-type personal computer. In addition, computers such as the computing device 1000 may also include other peripheral output devices such as speakers and printer, which may be connected through an output peripheral interface or the like.

The computer 1000 may operate in a networked environment using logical connections 1007 to one or more remote computers, such as a remote computer. The remote computer may be a personal computer, a server, a router, a network PC, a peer device or other common network node, and typically includes many or all of the elements described above relative to the computer 1000. The logical connections depicted in FIG. 10 include one or more local area networks (LAN) and one or more wide area networks (WAN), but may also include other networks. Such networking environments are commonplace in offices, enterprise-wide computer networks, intranets and the Internet.

When used in a LAN networking environment, the computer 1000 may be connected to a LAN through a network interface or adapter 1007. When used in a WAN networking environment, the computer 1000 typically includes a modem or other means for establishing communications over the WAN, such as the Internet. The modem, which may be internal or external, may be connected to the system bus 1003 via the network interface 1007 or other appropriate mechanism. A wireless networking component such as comprising an interface and antenna may be coupled through a suitable device such as an access point or peer computer to a WAN or LAN. In a networked environment, program modules depicted relative to the computer 1000, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
  sending an original HTTP request from a client application having a client domain to a server application having a server domain that is different than the client domain;
  selecting one of a plurality of formatters located on a server, the selected formatter identified based upon content of the original HTTP request;
  creating a modified HTTP request in the selected formatter using content in the original HTTP request to populate media types in the modified HTTP request, the media types associated with the server domain of the server application; and creating, in the selected formatter, an HTTP response to be consumed by the client application, the HTTP response formatted for the client domain based upon content in a server-domain response generated by the server application;

wherein the client application and server application are separate components of a single application running on a single device executing an operating system, and wherein creating the modified HTTP request occurs via an in-memory channel without using the operating system's network stack.

2. The method of claim 1, further comprising:
identifying a Uniform Resource Identifier (URI) within the original HTTP request; and
selecting the selected formatter based upon the URI.

3. The method of claim 1, further comprising:
identifying a media type accept header within the original HTTP request; and
selecting the selected formatter based upon the media type accept header.

4. The method of claim 1, wherein the formatting comprises:
combining two or more message handlers in an HTTP message handler pipeline; and
formatting the modified HTTP request using the HTTP message handler pipeline.

5. The method of claim 1, wherein the formatting comprises:
combining two or more operation handlers in an HTTP handler channel pipeline; and
formatting the modified HTTP request as a service operation using the HTTP handler channel pipeline.

6. A computer system, comprising:
one or more hardware processors;
one or more computer-readable storage media having stored thereon computer-executable instructions that, when executed by the one or more processors, causes the processors to perform a method for media type matching between a client application having a client domain and a server application having a server domain that is different than the client domain, the processors operating to:
receive an original HTTP request from the client application at a server;
select one of a plurality of formatters located on the server, the selected formatter identified based upon content of the original HTTP request;
generate in the selected formatter a modified HTTP request that is configured for the server domain using client-domain content in the original HTTP request to populate media types in the modified HTTP request, the media types associated with the server application; and
provide the modified HTTP request to the server application;

wherein the client application and server application are separate components of a single application running on a single device executing an operating system, and wherein creating the modified HTTP request occurs via an in-memory channel without using the operating system's network stack.

7. The computer system of claim 6, wherein the processors further operate to:
generate in the selected formatter a modified HTTP response that is configured for the client domain using content from an original server-domain HTTP response from the server application to populate media types associated with the client application.

8. The computer system of claim 6, wherein the processors further operate to:
identify a Uniform Resource Identifier (URI) within the original HTTP request; and
select the selected formatter based upon the URI.

9. The computer system of claim 6, wherein the processors further operate to:
identify a media type accept header within the original HTTP request; and
select the selected formatter based upon the media type accept header.

10. The computer system of claim 6, wherein the client application and server application are separate applications running on a single device.

11. The computer system of claim 6, wherein the client application and server application are separate components of a single application running on the processors.

12. The computer system of claim 6, wherein the processors further operate to:
combine two or more message handlers in an HTTP handler channel pipeline; and
generate the modified HTTP request using the HTTP handler channel pipeline.

13. The computer system of claim 6, wherein the processors further operate to:
combining two or more operation handlers in an HTTP handler channel pipeline; and
generate the modified HTTP request as a service operation using the HTTP handler channel pipeline.

14. A computer program product for implementing a method for media type matching between a client and a server, the computer program product comprising one or more computer-readable storage media having stored thereon computer-executable instructions that, when executed by one or more hardware processors of a computing system, cause the computing system to perform the method comprising of:
sending an original HTTP request from a client application having a client domain to a server application having a server domain that is different than the client domain;
selecting one of a plurality of formatters located on the server, the selected formatter identified based upon content of the original HTTP request;
creating in the selected formatter a modified HTTP request using content in the original HTTP request to populate media types in the modified HTTP request, the media types associated with a destination application running on the server; and
creating in the selected formatter an HTTP response from the server application to populate media types associated with the client application, the HTTP response formatted for the client domain based upon content in a server-domain response generated by the server application;

wherein the client application and server application are separate components of a single application running on a single device executing an operating system, and wherein creating the modified HTTP request occurs via an in-memory channel without using the operating system's network stack.

15. The computer program product of claim 14, further comprising:
identifying a Uniform Resource Identifier (URI) within the original HTTP request; and
selecting the selected formatter based upon the URI.

16. The computer program product of claim 14, further comprising:

identifying a media type accept header within the original HTTP request; and selecting the selected formatter based upon the media type accept header.

* * * * *